United States Patent
Kitano et al.

(10) Patent No.: US 12,351,469 B2
(45) Date of Patent: Jul. 8, 2025

(54) OXYNITRIDE HYDRIDE, SUPPORTED METAL MATERIAL CONTAINING OXYNITRIDE HYDRIDE, AND CATALYST FOR AMMONIA SYNTHESIS

(71) Applicant: JAPAN SCIENCE AND TECHNOLOGY AGENCY, Kawaguchi (JP)

(72) Inventors: Masaaki Kitano, Machida (JP); Hideo Hosono, Yamato (JP); Toshiharu Yokoyama, Yokohama (JP); Jun Kujirai, Niigata (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 854 days.

(21) Appl. No.: 17/433,669

(22) PCT Filed: Feb. 26, 2020

(86) PCT No.: PCT/JP2020/007774
§ 371 (c)(1),
(2) Date: Aug. 25, 2021

(87) PCT Pub. No.: WO2020/175558
PCT Pub. Date: Sep. 3, 2020

(65) Prior Publication Data
US 2022/0048782 A1 Feb. 17, 2022

(30) Foreign Application Priority Data
Feb. 27, 2019 (JP) ................ 2019-034878

(51) Int. Cl.
*C01C 1/04* (2006.01)
*B01J 23/00* (2006.01)
(Continued)

(52) U.S. Cl.
CPC .......... *C01C 1/0411* (2013.01); *B01J 23/002* (2013.01); *B01J 23/10* (2013.01); *B01J 23/462* (2013.01);
(Continued)

(58) Field of Classification Search
CPC ........ B01J 23/002; B01J 23/46; B01J 23/745; B01J 23/75; C01C 1/0411
See application file for complete search history.

(56) References Cited

U.S. PATENT DOCUMENTS 5,766,336 A * 6/1998 Jansen ................ C01B 21/0821
106/467
2014/0128252 A1 5/2014 Hosono et al.
(Continued)

FOREIGN PATENT DOCUMENTS

| CN | 103706360 A | 4/2014 |
| CN | 108472632 A | 8/2018 |

(Continued)

OTHER PUBLICATIONS

Kitano et al, Low-Temperature Synthesis of Perovskite Oxynitride-Hydrides as Ammonia Synthesis Catalysts, Journal of the American Chemical Society, 2019, 141, 20344-20353.*
(Continued)

*Primary Examiner* — Jun Li
(74) *Attorney, Agent, or Firm* — Panitch Schwarze Belisario & Nadel LLP

(57) ABSTRACT

A perovskite-type oxynitride hydride which can be easily synthesized achieves both improvement in catalytic performance and stabilization when used as a support of a catalyst. The oxynitride hydride is represented by general formula (1a) or (1b):

$$ABO_{3-x}N_yH_z \quad (1a)$$

$$AB_2O_{4-x}N_yH_z \quad (1b)$$

(Continued)

In the above general formulas (1a) and (1b), A is at least one selected from the group consisting of Ba and Sr; B is at least one selected from the group consisting of Ce, La and Y; x represents a number represented by $0.2 \leq x \leq 2.0$; y represents a number represented by $0.1 \leq y \leq 1.0$; and z represents a number represented by $0.1 \leq z \leq 1.0$.

19 Claims, 4 Drawing Sheets

(51) Int. Cl.
    *B01J 23/10* (2006.01)
    *B01J 23/46* (2006.01)
    *B01J 23/745* (2006.01)
    *B01J 23/75* (2006.01)
    *B01J 37/04* (2006.01)
    *B01J 37/08* (2006.01)

(52) U.S. Cl.
    CPC ............ *B01J 23/745* (2013.01); *B01J 23/75* (2013.01); *B01J 37/04* (2013.01); *B01J 37/08* (2013.01); *C01P 2002/72* (2013.01); *C01P 2002/84* (2013.01)

(56) References Cited

U.S. PATENT DOCUMENTS

| | | |
|---|---|---|
| 2016/0361712 A1 | 12/2016 | Hosono et al. |
| 2017/0088433 A1 | 3/2017 | Kageyama et al. |
| 2018/0304237 A1 | 10/2018 | Hosono et al. |

FOREIGN PATENT DOCUMENTS

| | | | | | |
|---|---|---|---|---|---|
| CN | 110808335 | A | * | 2/2020 | ......... H01L 51/0003 |
| CN | 111939907 | A | * | 11/2020 | |
| CN | 112973749 | A | * | 6/2021 | ............. B01J 27/24 |
| GB | 2573125 | A | * | 10/2019 | ............ B01J 23/002 |
| JP | 2003190815 | A | | 7/2003 | |
| JP | 2006231229 | A | | 9/2006 | |
| JP | 2017148810 | A | | 8/2017 | |
| JP | 6257767 | B2 | * | 1/2018 | ............. B01J 27/24 |
| WO | 2013008705 | A1 | | 1/2013 | |
| WO | 2015129471 | A1 | | 9/2015 | |
| WO | 2015136954 | A1 | | 9/2015 | |

OTHER PUBLICATIONS

International Search Report (PCT/ISA/210) with an English translation, and Written Opinion (PCT/ISA/237) mailed on Apr. 28, 2020, by the Japanese Patent Office as the International Searching Authority for International Application No. PCT/JP2020/007774. (9 pages).

Liu et al., "Synthesis and Magnetic Properties of BaCeLn(O,N)4, Ln=La, Ce", Journal of Solid State Chemistry, 89, 1990, pp. 366-371.

Shimoda, et al., "Ammonia synthesis over yttrium-doped barium zirconate and cerate-based perovskite-type oxide supported ruthenium catalysts", International Journal of Hydrogen Energy, 42, 2017, pp. 29745-29755.

Yajima et al., "Perovskite type oxyhydride", Journal of the Crystallographic Society of Japan, vol. 55, No. 4, 2013, pp. 242-247, with an English abstract.

Yang et al., "Low temperature ruthenium catalyst for ammonia synthesis supported on BaCeO3 nanocrystals", Catalysis Communications, 11, 2010, pp. 867-870.

Extended European Search Report issued Nov. 21, 2022, by the European Patent Office in corresponding European Application No. 20762193.9 (9 pages).

Vanova, A. S. et al., "New Y(La)-M-O Binary Systems (M=Ca, Sr, or Ba): Synthesis, Physicochemical Characterization, and Application As the Supports of Ruthenium Catalysts for Ammonia Synthesis", Kinetics and Catalysis Original Russian Text Copyright, vol. 45, No. 45, Jan. 1, 2004 (Jan. 1, 2004), pp. 541-546, XP055651233.

Office Action (Notification of the First Office Action) issued on Feb. 15, 2023, by the China National Intellectual Property Administration in corresponding Chinese Patent Application No. 2020800163996, and an English translation of the Office Action. (14 pages).

* cited by examiner

OXYNITRIDE HYDRIDE, SUPPORTED METAL MATERIAL CONTAINING OXYNITRIDE HYDRIDE, AND CATALYST FOR AMMONIA SYNTHESIS

TECHNICAL FIELD

The present invention relates to an oxynitride hydride, a supported metal material containing the oxynitride hydride, and a catalyst for ammonia synthesis.

This application claims priority under Japanese Patent Application No. 2019-034878, filed Feb. 27, 2019, the contents of which are incorporated herein.

BACKGROUND

As a typical ammonia synthesis method, the Haber-Bosch method uses a doubly promoted iron catalyst containing several percent by mass of $Al_2O_3$ and $K_2O$ in $Fe_3O_4$ as a catalyst, and brings a mixed gas of nitrogen and hydrogen into contact with the catalyst under high temperature and high pressure conditions to produce ammonia. This technology is widely used industrially in the production process as almost the same as it was completed.

On the other hand, a method of producing ammonia at a temperature lower than the reaction temperature of the Haber-Bosch method has been studied. Catalysts capable of producing ammonia by contacting with nitrogen and hydrogen have been investigated, and transition metals have been studied as their catalytically active components. Among them, a method using ruthenium (Ru) as a catalyst active component on various catalyst supports and using it as a catalyst for ammonia synthesis has been proposed as an efficient method (for example, Patent Document 1).

In addition, it has been reported that a metal supported catalyst in which a metal oxide $BaCeO_3$ having a perovskite crystal structure is used as a support and Ru is supported on the support (e.g., Non-Patent Document 1). Also, it has been reported that a metal supported catalyst in which Zr doped $BaCeO_3$ ($Ru/BaCe_{1-x}Y_xO_{3-y}$) is used as a support and Ru is supported on the support (e.g., Non-Patent Document 2).

On the other hand, a method for synthesizing nitrogen-doped $BaCe_2O_4$ (oxynitride, $BaCe_2(O,N)_4$) has been reported, but there is no disclosure for using it as a catalyst for ammonia synthesis (for example, Non-Patent Document 3).

PATENT DOCUMENTS

[Patent Document 1]: Japanese Unexamined Patent Application, First Publication No. 2006-231229

Non-Patent Documents

[Non-Patent Document 1] Yang, Xiao-Long et al., "Catalysis Communications" 11, p. 867-870 (2010).
[Non-Patent Document 2] Shimoda, Naohiro et al., "International Journal of Hydrogen Energy" 42, p. 29745-29755 (2017).
[Non-Patent Document 3] Liu, Guo et al. "Journal of Solid State Chemistry" 89, p. 366-371 (1990).

SUMMARY OF INVENTION

Problems to be Solved by the Invention

Although the ammonia synthesis by the Haber-Bosch method using a doubly promoted iron catalyst has been put into practical use, it requires a high temperature and pressure condition. Therefore, there is a problem that the burden on an apparatus and the cost is high.

The supported metal catalyst as disclosed in Patent Document 1 uses a carbonaceous support such as activated carbon or an inorganic oxide support. However, the supported metal catalysts have a low reaction activity and has an insufficient performance for practical use.

That is, a catalyst for ammonia synthesis having a sufficient reactivity even under a condition of lower temperature and lower pressure, than the reaction conditions of the Haber-Bosch method, is required.

Means for Solving Problems

The inventors of the present invention found that a catalysts for ammonia synthesis of the present invention which can achieve both improvement in catalytic performance and stabilization by loading a transition metal on a composition containing an oxynitride hydride. In particular, the inventors of the present invention found that in one embodiment, a catalyst for ammonia synthesis of the present invention can achieve both improvement in catalytic performance and stabilization by loading a transition metal on a composition containing a perovskite-type oxynitride hydride.

That is, the subject matter of the present invention is:

[1] An oxynitride hydride represented by the following general formula (1a) or (1b),

$$ABO_{3-x}N_yH_z \qquad (1a)$$

$$AB_2O_{4-x}N_yH_z \qquad (1b)$$

wherein, in the general formula (1a), A is at least one kind selected from the group consisting of Ba and Sr; B is Ce; x represents a number represented by $0.2 \leq x \leq 2.0$; y represents a number represented by $0.1 \leq y \leq 1.0$; and z represents a number represented by $0.1 \leq z \leq 1.0$, and in the above general formula (1b), A is at least one kind selected from the group consisting of Ba and Sr; B is at least one kind selected from the group consisting of Ce, La and Y; x represents a number represented by $0.2 \leq x \leq 2.0$; y represents a number represented by $0.1 \leq y \leq 1.0$; and z represents a number represented by $0.1 \leq z \leq 1.0$.

[2] A perovskite-type oxynitride hydride represented by the following general formula (2),

$$BaCeO_{3-x}N_yH_z \qquad (2)$$

wherein, in the general formula (2), x represents a number represented by $0.2 \leq x \leq 2.0$; y represents a number represented by $0.1 \leq y \leq 1.0$; and z represents a number represented by $0.1 \leq z \leq 1.0$.

[3] A supported metal material in which a transition metal (M) is supported on a support,
wherein the supported metal material is a composition comprising the oxynitride hydride according to [1] or [2].

[4] The supported metal material according to [3], wherein a loading amount of the transition metal (M) is 0.01 parts by mass or more and 50 parts by mass or less with respect to 100 parts by mass of the support.

[5] The supported metal material according to [3] or [4], wherein the transition metal (M) is at least one selected from the group consisting of Ru, Co and Fe.

[6] A supported metal catalyst comprising the supported metal material according to any one of [3] to [5].

[7] A catalyst for ammonia synthesis comprising the supported metal material according to any one of [3] to [5].

[8] A catalyst for ammonia synthesis, which is a composition containing the oxynitride hydride according to [1] or [2].

[9] A method for producing ammonia, wherein nitrogen and hydrogen are reacted in the presence of the supported metal catalyst according to [6].

[10] A method for producing an oxynitride hydride represented by the following general formula (1a) or (1b), the method comprises a step of heating a compound represented by the following general formula (3) and a compound represented by the following general formula (4a) or (4b) in an ammonia atmosphere, $$ABO_{3-x}N_yH_z \quad (1a)$$

$$AB_2O_{4-x}N_yH_z \quad (1b)$$

$$A(NH_2)_2 \quad (3)$$

$$BO_2 \quad (4a)$$

$$B_2O_3 \quad (4b)$$

wherein, in the formulas (1a), (3) and (4a), A is at least one kind selected from the group consisting of Ba and Sr; B is Ce; x represents a number represented by $0.2 \leq x \leq 2.0$; y represents a number represented by $0.1 \leq y \leq 1.0$; and z represents a number represented by $0.1 \leq z \leq 1.0$, and in the above general formulas (1b) and (4b), A is at least one kind selected from the group consisting of Ba and Sr; B is Ce, La and Y; x represents a number represented by $0.2 \leq x \leq 2.0$; y represents a number represented by $0.1 \leq y \leq 1.0$; and z represents a number represented by $0.1 \leq z \leq 1.0$.

[11] A method for producing a perovskite-type oxynitride hydride represented by the following general formula (2), the method comprises a step of heating $CeO_2$ and $Ba(NH_2)_2$ in an ammonia atmosphere, $$BaCeO_{3-x}N_yH_z \quad (2)$$

wherein, in the general formula (2), x represents a number represented by $0.2 \leq x \leq 2.0$; y represents a number represented by $0.1 \leq y \leq 1.0$; and z represents a number represented by $0.1 \leq z \leq 1.0$.

Effect of the Invention

The oxynitride hydride of the present invention, particularly the perovskite-type oxynitride hydride of one embodiment, when used as a catalyst for ammonia synthesis, is suitable as a catalyst for ammonia synthesis because it has a high ammonia synthesis activity even at a low reaction temperature and a low reaction pressure, and no decrease in catalytic activity is observed even if the synthesis reaction is repeated.

Further, in one embodiment of the present invention, compared with a conventional method for synthesizing a perovskite oxynitride, a composition containing the perovskite oxynitride hydride of the present invention can be synthesized in a low-temperature heat treatment process, nitrogen or hydrogen can be introduced in a higher concentration than in a conventional method, and the method is excellent in terms of productivity and cost.

DESCRIPTION OF THE INVENTION

Figure 1:
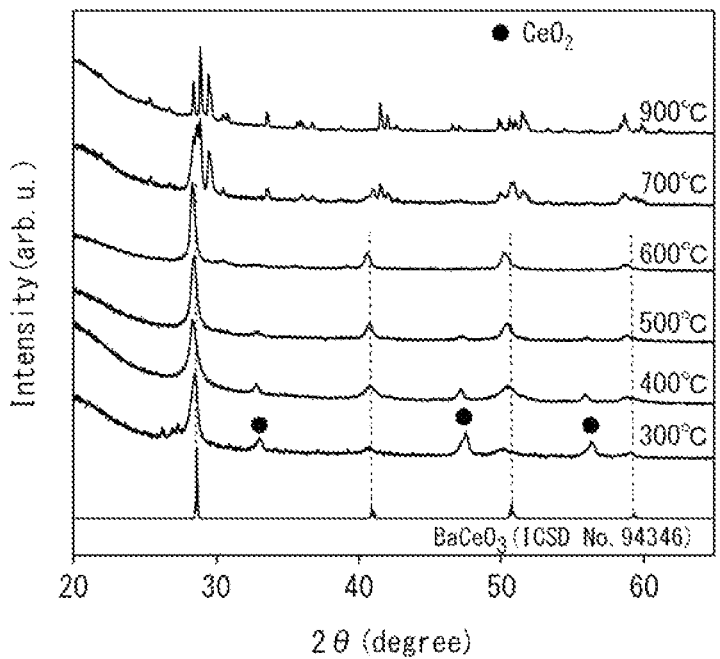
FIG. 1 is an XRD pattern of perovskite-type oxynitride hydride powder synthesized in Examples 1 and 4 to 8 at various heat treatment temperatures.

The present invention will now be described in detail.
(Oxynitride Hydride)

The oxynitride hydride of the present invention is an oxynitride hydride in which nitrogen and hydrogen are doped into an oxygen site of a composite oxide represented by the following general formula (5a) or (5b). The oxynitride hydride of the present invention is a compound represented by the following general formula (1a) or (1b). It is preferable that the oxynitride hydride has the same type of crystal structure as the composite oxide represented by the following general formula (5a) or (5b) which is not doped with nitrogen or hydrogen. That is, it is preferable that the oxynitride hydride of the present embodiment maintains the crystal structure of the composite oxide while doping nitrogen and hydrogen into the oxygen site of the composite oxide represented by the following general formula (5).

$$ABO_3 \quad (5a)$$

$$AB_2O_4 \quad (5b)$$

In the above general formula (5a), A is at least one selected from the group consisting of Ba and Sr, and B is Ce.

In formula (5b), A is at least one selected from the group consisting of Ba and Sr, and B is at least one selected from the group consisting of Ce, La and Y.

$$ABO_{3-x}N_yH_z \quad (1a)$$

$$AB_2O_{4-x}N_yH_z \quad (1b)$$

In the above general formula (1a), A is at least one selected from the group consisting of Ba and Sr; B is Ce; x represents a number represented by $0.2 \leq x \leq 2.0$; y represents a number represented by $0.1 \leq y \leq 1.0$; z represents a number represented by $0.1 \leq z \leq 1.0$.

In the above general formula (1b), A is at least one kind selected from the group consisting of Ba and Sr; B is at least one kind selected from the group consisting of Ce, La and Y; x represents a number represented by $0.2 \leq x \leq 2.0$; y represents a number represented by $0.1 \leq y \leq 1.0$; z represents a number represented by $0.1 \leq z \leq 1.0$.

The amount of nitrogen and the amount of hydrogen doped in the oxynitride hydride are not particularly limited.

It is preferable to maintain the crystal structure of the composite oxide represented by the general formula (5a) or (5b).

The relationship of x, y, z is preferably, for example, $2x-(3y+z)=0$ such that the oxynitride hydride is charge neutral.

In the above general formula (1 a) or (1 b), it is preferable that x represents a number represented by $0.5 \leq x \leq 1.6$; y represents a number represented by $0.25 \leq y \leq 0.8$; z represents a number represented by $0.1 \leq z \leq 0.8$.

In the above general formula (1 a) or (1 b), it is more preferable that x represents a number represented by $1.0 \leq x \leq 1.4$; y represents a number represented by $0.4 \leq y \leq 0.6$; z represents a number represented by $0.2 \leq z \leq 0.5$.

The doped nitrogen and hydrogen may be partially substituted with atoms other than both nitrogen and hydrogen, and specifically may contain electron, carbon, halogen atom, and the like, as long as the effect of the present invention is not impaired.

Examples of the oxynitride hydride of the present invention include, for example, $BaCeO_{3-x}N_yH_z$, $BaCe_2O_{4-x}N_yH_z$, $BaLa_2O_{4-x}N_yH_z$, $BaY_2O_{4-x}N_yH_z$, $SrCeO_{3-x}N_yH_z$, $Sr_3La_4O_{9-x}N_yH_z$, and $SrY_2O_{4-x}N_yH_z$. Among them, $BaCeO_{3-x}N_yH_z$, $BaCe_2O_{4-x}N_yH_z$, $BaLa_2O_{4-x}N_yH_z$, and $SrCeO_{3-x}N_yH_z$ are preferable.

(Method for Producing Oxynitride Hydride)

The method for producing the oxynitride hydride represented by the general formula (1a) or (1b) of the present embodiment includes a step of heating the compound represented by the general formula (3) and the compound represented by the general formula (4a) or (4b) in an ammonia atmosphere. A detailed production method will be described in the following Examples. For example, the method includes a mixing step of mixing the compound represented by the general formula (3) with the compound represented by the general formula (4a) or (4b), and a heating step of heating the mixture obtained in the mixing step in an ammonia atmosphere. Further, it is preferable to further include a pretreatment step of dehydrating the compound represented by the general formula (4a) or (4b) before the mixing step. In this case, in the mixing step, the dehydrated compound represented by the general formula (3) is preferably mixed in a rare gas atmosphere such as in an Ar glove box.

As the dehydrating step, for example, a vacuum heat treatment at 300° C. or higher and lower than 900° C., preferably 400° C. or higher and lower than 800° C., and more preferably 500° C. or higher and lower than 700° C. can be used.

As the heat treatment, for example, a method of heat treatment in an ammonia stream at 300° C. or more and less than 900° C. for 1 to 24 hours, preferably at 300° C. or more and less than 700° C. for 2 to 12 hours, and more preferably at 400° C. or more and less than 700° C. for 2 to 6 hours can be used.

The molar ratio (B:A) of B (at least one selected from the group consisting of Ce, La and Y) to A (at least one selected from the group consisting of Ba and Sr) is preferably 2:4 to 4:2 (mol/mol), more preferably 2:3 to 3:2 (mol/mol), still more preferably 0.8:1.0 to 1.0:0.8, and particularly preferably 0.95:1.0 to 1.0:0.95. In the case where B is La or Y, it is more preferable that the above molar ratio is 2:3 to 2:5 (mol/mol), and it is still more preferable that the above molar ratio is 1:2.

The raw material of the compound represented by the general formula (3) to be used and the raw material of the compound represented by general formula (4a) or (4b) are preferably powder. For example, the compound represented by the above general formula (4a) or (4b) is a commercially available compound. The compound represented by the above general formula (4a) or (4b) can be synthesized by the following procedure. Metal A (A is at least one selected from the group consisting of Ba and Sr.) of purity 99.99% was placed in a pressure vessel, and ammonia gas was introduced into the vessel while cooling the vessel to about −50° C., thereby dissolving the metal A. The resulting dissolved material was then stirred at −50° C. for 1 hour and then brought to room temperature.

Thereafter, the container was immersed in an oil bath and held at 100° C. for 1 hour while stirring, and then the container was cooled to room temperature. After cooling, the ammonia gas remaining in the container is exhausted to obtain a compound represented by the above general formula (4a) or (4b).

First Embodiment (Perovskite-Type Oxynitride Hydride)

The oxynitride hydride of the first embodiment of the present invention is a perovskite type oxynitride hydride having a perovskite type crystal structure. The perovskite-type oxynitride hydride is a perovskite-type oxynitride hydride in which nitrogen and hydrogen are doped in the oxygen site of $BaCeO_3$. The perovskite-type oxynitride hydride of the first embodiment of the present invention (hereafter, this embodiment may be referred to as the present embodiment.) is a compound having a perovskite-type crystal structure represented by the following general formula (2). It has the same type of crystal structure as that of $BaCeO_3$ without nitrogen or hydrogen doping. That is, it is preferable that the perovskite-type oxynitride hydride of the present embodiment maintains the perovskite-type crystal structure while nitrogen and hydrogen are doped into the oxygen site of $BaCeO_3$.

$$BaCeO_{3-x}N_yH_z \qquad (2)$$

In the above general formula (2), x represents a number represented by $0.2 \leq x \leq 2.0$; y represents a number represented by $0.1 \leq y \leq 1.0$; z represents a number represented by $0.1 \leq z \leq 1.0$.

The amount of nitrogen and the amount of hydrogen doped in the perovskite-type oxynitride hydride of the present embodiment are not particularly limited as long as the perovskite-type crystal structure of $BaCeO_3$ can be maintained.

The relation of x, y, z is preferably $2x-(3y+z)=0$, for example, so that the perovskite-type oxynitride hydride is charge neutral.

In the above general formula (2), it is preferable that x represents a number represented by $0.5 \leq x \leq 1.6$; y represents a number represented by $0.25 \leq y \leq 0.8$; z represents a number represented by $0.1 \leq z \leq 0.8$.

In the above general formula (2), it is more preferable that x represents a number represented by $1.0 \leq x \leq 1.4$; y represents a number represented by $0.4 \leq y \leq 0.6$; z represents a number represented by $0.2 \leq z \leq 0.5$.

For example, a perovskite-type oxynitride represented by $BaCeO_{2.03}N_{0.51}H_{0.41}$ (The oxidation number of all Ce is set to be quadrivalent.) was synthesized in the following Examples.

The doped nitrogen and hydrogen may be partially substituted with atoms other than both nitrogen and hydrogen, and specifically may contain electron, carbon, halogen atom, and the like, as long as the effect of the present invention is not impaired.

(Method for Producing Perovskite-type Oxynitride Hydride)

The method for producing the perovskite-type oxynitride hydride represented by the above general formula (2) of the present embodiment includes a step of heating $CeO_2$ and $Ba(NH_2)_2$ in an ammonia atmosphere. A detailed production method will be described in the following Examples. The method for producing the perovskite-type oxynitride $BaCeO_{3-x}N_yH_z$ of the present embodiment includes, for example, a mixing step of mixing $CeO_2$ and $Ba(NH_2)_2$, and a heating step of heating the mixture obtained in the mixing step in an ammonia atmosphere. It is preferable to further include a pretreatment step of dehydrating $CeO_2$ before the mixing step. In this case, in the mixing step, dehydrated $CeO_2$ and $Ba(NH_2)_2$ are preferably mixed in a rare gas atmosphere such as in an Ar glove box.

As the dehydrating step, for example, a vacuum heat treatment at 300° C. or higher and lower than 900° C., preferably 400° C. or higher and lower than 800° C., and more preferably 500° C. or higher and lower than 700° C. can be used.

As the heat treatment, for example, a method of heat treatment in an ammonia stream at 300° C. or more and less than 900° C. for 1 to 24 hours, preferably at 300° C. or more and less than 700° C. for 2 to 12 hours, and more preferably at 400° C. or more and less than 700° C. for 2 to 6 hours can be used.

The molar ratio of Ce to Ba (Ce:Ba) is preferably 0.5:1.0 to 1.0:0.5 (mol/mol), more preferably 0.8:1.0 to 1.0:0.8, and still more preferably 0.95:1.0 to 1.0:0.95.

The form of the raw material $CeO_2$ used and the form of the raw material $Ba(NH_2)_2$ are preferably powder. Examples include commercially available Aldrich $CeO_2$ powders (average particle size: less than 25 nm). $Ba(NH_2)_2$ can be synthesized by the following procedure. A metal Ba (Aldrich, 99.99% pure) was put into a pressure vessel, and ammonia gas was introduced into the vessel while cooling the vessel to about −50° C. to dissolve the metal Ba. The resulting dissolved material was then stirred at −50° C. for 1 hour and the vessel was brought to room temperature.

Thereafter, the container was immersed in an oil bath and held at 100° C. for 1 hour while stirring, and then the container was cooled to room temperature. After cooling, the ammonia gas remaining in the container was exhausted to obtain $Ba(NH_2)_2$.

The perovskite oxynitride of the present embodiment is preferably a perovskite oxynitride obtained by heating $CeO_2$ and $Ba(NH_2)_2$ in an ammonia atmosphere. More preferably, the perovskite-type oxynitride hydride is obtained by a production method including a mixing step of mixing $CeO_2$ and $Ba(NH_2)_2$ and a heat treatment step of heat-treating the mixture obtained in the mixing step in an ammonia atmosphere. It is preferable to further include a pretreatment step of dehydrating $CeO_2$ before the mixing step. In this case, in the mixing step, dehydrated $CeO_2$ and $Ba(NH_2)_2$ are preferably mixed in a rare gas atmosphere such as in an Ar glove box. In addition, the preferable heat treatment temperature, the preferable heating time, the ratio of the amount of feed of the preferable raw material, and the like are the same as in the above-mentioned production method.

<Determination of Content of Nitrogen and Hydrogen in Perovskite-Type Oxynitride Hydride>

The amount of desorbed nitrogen and hydrogen can be obtained by analyzing the synthesized perovskite-type oxynitride hydride $BaCeO_{3-x}N_yH_z$ with a temperature-programmed desorption analyzer (BELCATA). The ratio of nitrogen and hydrogen contained in the perovskite-type oxynitride hydride is obtained based on the result of the amount of nitrogen and hydrogen desorbed. For example, in a later Example, the $BaCeO_{3-x}N_yH_z$ synthesized at 600° C. can be represented as $BaCeO_{2.03}N_{0.51}H_{0.41}$ (The oxidation number of all Ce is set to be quadrivalent.) based on the results analyzed by a temperature-programmed desorption analyzer (BELCATA).

(Supported Metal Material)

The supported metal material of the present invention is obtained by loading a transition metal (M) on a support. The support contains an oxynitride hydride obtained by doping nitrogen and hydrogen into an oxygen site of a composite oxide represented by the general formula (5). Hereinafter, the supported metal material of the present invention will be described by using an example of the supported metal material of one embodiment of the present invention (hereinafter, the present embodiment) obtained by using a perovskite-type oxynitride hydride.

The supported metal material of the present embodiment is formed by loading a transition metal (M) on a support. The support contains a perovskite-type oxynitride hydride in which nitrogen and hydrogen are doped in oxygen sites of $BaCeO_3$. The transition metal (M) is preferably at least one selected from the group consisting of Ru, Co and Fe.

The loading amount of the transition metal is not particularly limited, but is generally 0.01 parts by mass (0.01% by mass) or more, preferably 0.5 parts by mass (0.5% by mass) or more, more preferably 1 part by mass (1% by mass) or more, even more preferably 2 parts by mass (2% by mass) or more, and generally 50 parts by mass (50% by mass) or less, preferably 30 parts by mass (30% by mass) or less, more preferably 20 parts by mass (20% by mass) or less, and still more preferably 10 parts by mass (10% by mass) or less, with respect to 100 parts by mass of the support. When the value is equal to or larger than the lower limit value, the effect of the present invention can be obtained, and when the value is equal to or smaller than the upper limit value, the effect of the present invention can be obtained in proportion to the loading amount and the cost.

The supported metal material of the present embodiment is formed by loading a transition metal (M) on a support. Preferably, the support is a composition containing a perovskite-type oxynitride hydride obtained by heating $CeO_2$ and $Ba(NH_2)_2$ in an ammonia atmosphere. More preferably, the composition contains a perovskite-type oxynitride hydride obtained by a production method including a mixing step of mixing $CeO_2$ and $Ba(NH_2)_2$ and a heat treatment step of heat-treating the mixture obtained by the mixing step in an ammonia atmosphere. It is preferable to further include a pretreatment step of dehydrating $CeO_2$ before the mixing step. In this case, in the mixing step, dehydrated $CeO_2$ and $Ba(NH_2)_2$ are preferably mixed in a rare gas atmosphere such as in an Ar glove box. In addition, the preferable heat treatment temperature, the preferable heating time, the ratio of the adding amount of the preferable raw materials, and the like are the same as in the above-mentioned production method.

<Transition Metal>

As the transition metal used in the present embodiment, it is not particularly limited, but transition metals from Groups 6, 7, 8, 9, or 10 of the periodic table may be used, preferably those from Groups 6, 8, or 9 may be used, and more preferably those from Groups 8 or 9 may be used.

As the specific metal element, it is not particularly limited, but Cr, Mo, Mn, Re, Fe, Ru, Os, Co, Rh, Ni, Pd, or Pt may be used. Mo, Re, Fe, Ru, Os, or Co may be used preferably in view of high bonding energy with nitrogen. Ru, Co, or Fe may be used more preferably in view of catalytic activity on synthesizing ammonia when supported metal material is used as a supported metal catalyst. And, Ru may be used most preferably in view of the highest catalytic activity.

Each of the above elements may be used alone, or two or more of them may be used in combination. Intermetallic compounds of these elements such as $Co_3Mo_3N$, $Fe_3Mo_3N$, $Ni_2Mo_3N$, $Mo_2N$ and the like may also be used. Each element may be used alone or in combination of two or more kinds; and preferably, each element may be used alone in view of cost.

<Method for Loading Transition Metal (M) on Perovskite-Type Oxynitride Hydride>

The method for loading the transition metal (M) on the perovskite-type oxynitride hydride is not particularly limited, but for example, a perovskite-type oxynitride hydride ($BaCeO_{3-x}N_yH_z$) powder obtained by the above method and a compound of metal to be supported were inserted into a silica glass tube, heated at 50° C. or more and 90° C. or less for 0.5 to 4 hours in a vacuum, and then subsequently heated at 100° C. or more and 150° C. or less for 0.5 to 4 hours, thereby adhering the compound of metal to be supported on the surface of the $BaCeO_{3-x}N_yH_z$ powder. Finally, by heating at 150° C. or more and 300° C. or less for 0.5 to 5 hours and pyrolyzing the metal compound, a supported metal material in which the transition metal (M) is fixed on $BaCeO_{3-x}N_yH_z$ ($M/BaCeO_{3-x}N_yH_z$) can be obtained.

For example, Ru-supported $BaCeO_{3-x}N_yH_z$ (abbreviated as $Ru/BaCeO_{3-x}N_yH_z$), Co-supported $BaCeO_{3-x}N_yH_z$ (abbreviated as $Co/BaCeO_{3-x}N_yH_z$), and Fe-supported $BaCeO_{3-x}N_yH_z$ (abbreviated as $Fe/BaCeO_{3-x}N_yH_z$) can be synthesized using transition metal compounds $Ru_3(CO)_{12}$, $Co_2(CO)_8$, $Fe_2(CO)_9$, where the transition metals (M) are Ru, Co, and Fe, respectively.

<Shape of Supported Metal Material>

The shape of the supported metal material of the present embodiment is not particularly limited, and may be in any form such as lump, powder, coating, etc., but preferably it may be powder. The particle size of the supported metal material powder is not particularly limited, but it may be 1 nm to 10 μm.

The particle diameter of the transition metal in the supported metal material of the present embodiment is not particularly limited, but it may be 1 nm or more and 100 nm or less. It is preferably 20 nm or less, and more preferably 10 nm or less in view of increasing the number of step sites, which is the active point of nitrogen dissociation when the supported metal material is used as a catalyst for ammonia synthesis.

(Supported Metal Catalyst)

The supported metal catalyst of the present invention contains the supported metal material. Hereinafter, a supported metal catalyst of the present invention will be described by using an example of a supported metal catalyst of one embodiment (hereinafter, the present embodiment) obtained using a perovskite-type oxynitride hydride.

The supported metal catalyst of the present embodiment is made of the supported metal material. The supported metal catalyst of the present embodiment includes a transition metal and a support for loading the transition metal, and the support is a composition containing a perovskite-type oxynitride hydride represented by the following general formula (2).

$$BaCeO_{3-x}N_yH_z \quad (2)$$

(In the above general formula (2), x represents a number represented by $0.2 \leq x \leq 2.0$; y represents a number represented by $0.1 \leq y \leq 1.0$; z represents a number represented by $0.1 \leq z \leq 1.0$.)

(Catalysts for Ammonia Synthesis)

The catalyst for ammonia synthesis of the present invention is obtained by loading a transition metal (M) on a support. Hereinafter, the ammonia synthesis catalyst of the present invention will be described by using an example of the ammonia synthesis catalyst of one embodiment obtained by using the perovskite type oxynitride hydride.

The catalyst for ammonia synthesis of the present embodiment is formed by loading a transition metal (M) on a support. The support contains a perovskite-type oxynitride hydride in which nitrogen and hydrogen are doped in oxygen sites of $BaCeO_3$. The ammonia synthesis catalyst of the present embodiment includes a transition metal and a support supporting the transition metal, and the support is a composition containing a perovskite-type oxynitride hydride represented by the general formula (2). It is preferable that the support is a composition containing the perovskite type oxynitride hydride of the above-described embodiment.

$$BaCeO_{3-x}N_yH_z \quad (2)$$

(In the above general formula (2), x represents a number represented by $0.2 \leq x \leq 2.0$; y represents a number represented by $0.1 \leq y \leq 1.0$; z represents a number represented by $0.1 \leq z \leq 1.0$.)

The nitrogen and the hydrogen may further contain atoms other than both nitrogen and hydrogen, and specifically may contain electron, carbon, halogen atom, and the like, as long as the effect of the present invention is not impaired.

<Transition Metals>

As the transition metal used in the present embodiment, it is not particularly limited, but transition metals from Groups 6, 7, 8, 9, or 10 of the periodic table may be used, preferably those from Groups 6, 8, or 9 may be used, and more preferably those from Groups 8 or 9 may be used.

As the specific metal element, it is not particularly limited, but Cr, Mo, Mn, Re, Fe, Ru, Os, Co, Rh, Ni, Pd, or Pt may be used. Mo, Re, Fe, Ru, Os, or Co may be used preferably in view of high bonding energy with nitrogen. Ru, Co, or Fe may be used more preferably in view of catalytic activity on synthesizing ammonia when supported metal material is used as a supported metal catalyst. And, Ru may be used most preferably in view of the highest catalytic activity.

Each of the above elements may be used alone, or two or more of them may be used in combination. Intermetallic compounds of these elements such as $Co_3Mo_3N$, $Fe_3Mo_3N$, $Ni_2Mo_3N$, $Mo_2N$ and the like may also be used. Each element may be used alone or in combination of two or more kinds; and preferably, each element may be used alone in view of cost.

(Method for Producing Catalyst for Ammonia Synthesis)

The method for producing the catalyst for ammonia synthesis comprises loading the transition metal on the support containing the composition containing the oxynitride hydride of the present invention. Hereinafter, using an example of a method for producing a catalyst for ammonia synthesis obtained by using a perovskite-type oxynitride hydride, a method for producing the catalyst for ammonia synthesis according to the present invention will be described.

The catalyst for ammonia synthesis according to one embodiment of the present invention is formed by loading a transition metal (M) on a support. The support contains a perovskite-type oxynitride hydride in which nitrogen and hydrogen are doped in oxygen sites of $BaCeO_3$. The catalyst for ammonia synthesis of the present embodiment is manufactured by loading the transition metal on the support containing the composition containing the perovskite-type oxynitride hydride.

The production method is not particularly limited, but the catalyst is usually produced by loading a transition metal or a compound which is a precursor of the transition metal (hereinafter, transition metal compound) on the support.

The composition of the perovskite-type oxynitride hydride used as the raw material for the ammonia synthesis catalyst of the present embodiment may be obtained by using a commercially available reagent or an industrial raw material, or by using a material obtained by a known method from the corresponding metal.

The perovskite-type oxynitride hydride composition used in the present embodiment may be subjected to a pretreatment for heating at about 200 to 500° C. for several hours, for example, 340° C. for 2 hours in a hydrogen atmosphere, and then the transition metal can be carried in a transition metal loading step described later.

In the catalyst manufactured by using the sample previously heated under the hydrogen atmosphere of the support, for example, when used for the ammonia synthesis reaction, high activity is obtained immediately after the start of the reaction.

The method of loading a transition metal on the support used in the present embodiment is not particularly limited, and known methods can be used. Generally, a method is used in which a transition metal compound which is a compound of a supported transition metal and can be converted into a transition metal by reduction, thermal decomposition, or the like is supported on the support and then converted into a transition metal.

As the transition metal compound, it is not particularly limited, but an inorganic compound or an organic transition metal complex of a transition metal easily susceptible to thermal decomposition or the like may be used. Specifically, a complex of transition metal, an oxide of transition metal, a transition metal salt such as a nitrate and a hydrochloride, or the like may be used.

For example, as a Ru compound, triruthenium dodecacarbonyl[$Ru_3(CO)_{12}$], dichloro tetrakis (triphenylphosphine) ruthenium (II)[$RuCl_2(PPh_3)_4$], dichloro-tris (triphenylphosphine) ruthenium (II)[$RuCl_2(PPh_3)_3$], tris (acetylacetonato) ruthenium (III)[$Ru(acac)_3$], ruthenocene [$Ru(C_5H_5)$], nitrosyl ruthenium nitrate [$Ru(NO)(NO_3)_3$], potassium ruthenate, ruthenium oxide, ruthenium nitrate, ruthenium chloride, or the like may be used. Tris (acetylacetonato) ruthenium (III)[$Ru(acac)_3$] is preferable.

As an Fe compound, iron pentacarbonyl [$Fe(CO)_5$], dodecacarbonyl ferric [$Fe_3(CO)_{12}$], nona carbonyl iron [$Fe_2(CO)_9$], tetracarbonyl iron iodide [$Fe(CO)_4I_2$], tris (acetylacetonato) iron(III) [$Fe(acac)_3$], ferrocene [$Fe(C_5H_5)_2$], iron oxide, iron nitrate, iron chloride ($FeCl_3$), etc.), or the like may be used.

As a Co compound, cobalt octacarbonyl [$Co_2(CO)_8$], tris (acetylacetonato) cobalt (III)[$Co(acac)_3$], cobalt (II) acetylacetonate [$Co(acac)_2$], cobaltocene [$Co(C_5H_5)_2$], cobalt oxide, cobalt nitrate, cobalt chloride, or the like may be used.

A carbonyl complex of transition metal such as [$Ru_3(CO)_{12}$], [$Fe(CO)_5$], [$Fe_3(CO)_{12}$], [$Fe_2(CO)_9$], or [$Co_2(CO)_8$] among these transition metal compounds is preferable in view that the reduction treatment to be described later can be omitted in the production of the supported metal material of the present embodiment because the transition metal may be loaded by loading the carbonyl complex and then heating it.

The loading amount of the transition metal compound to be used is not particularly limited and an amount to realize a desired loading amount can be suitably used, but normally, with respect to 100 parts by mass of the support used, the amount is usually 0.01 parts by mass (0.01% by mass) or more, preferably 2 parts by mass (2% by mass) or more, more preferably 10 parts by mass (10% by mass) or more, even more preferably 20 parts by mass (20% by mass) or more, and usually 50 parts by mass (50% by mass) or less, preferably 40 parts by mass (40% by mass) or less, and more preferably 30 parts by mass (30% by mass) or less.

As the method for loading the transition metal compound on the support, for example, a physical mixing method, a CVD method (chemical vapor deposition method), a sputtering method, or the like can be used.

In the physical mixing method, the support and the transition metal compound are mixed in a solid state and then heated in an inert gas stream such as nitrogen, argon, helium or under vacuum. The heating temperature at this time is not particularly limited, but is usually 200° C. or higher and 600° C. or lower. The heating time is not particularly limited, but usually 2 hours or more is desirable.

When a transition metal compound which may be converted to a transition metal by thermal decomposition is used, at this stage, a transition metal is loaded and it becomes the supported metal material of the present embodiment.

In the case of using a transition metal compound other than the above-mentioned transition metal compound which may be converted to a transition metal by thermal decomposition, a transition metal compound may be reduced to obtain the supported metal material of the present invention.

A method of reducing the transition metal compound (hereinafter referred to as "reduction treatment") is not particularly limited as long as it does not disturb the object of the present invention, and examples thereof include a method in which the transition metal compound is reduced in a gas atmosphere containing a reducing gas, and a method in which a reducing agent such as $NaBH_4$, $NH_2NH_2$ or formalin is added to the solution of the transition metal compound to precipitate the transition metal on the surface of the metal hydride. However, the method in which the transition metal compound is reduced in a gas atmosphere containing a reducing gas is preferable. Examples of the reducing gas include hydrogen, ammonia, methanol (vapor), ethanol (vapor), methane, ethane and the like.

During the reduction treatment, a component other than the reducing gas which does not inhibit the object of the present invention, particularly the ammonia synthesis reaction, may coexist with the reaction system. Specifically, at the time of the reduction treatment, in addition to the reducing gas such as hydrogen, a gas such as argon or nitrogen which does not inhibit the reaction may be allowed to coexist, and nitrogen is preferably allowed to coexist.

When the reduction treatment is carried out in a gas containing hydrogen, it can be carried out in parallel with the production of ammonia to be described later by allowing nitrogen to coexist with hydrogen. That is, when the supported metal material of the present embodiment is used as a catalyst for ammonia synthesis described later, by placing the transition metal compound supported on the metal hydride in the reaction conditions of the ammonia synthesis reaction, the transition metal compound may be reduced and converted to the transition metal.

The temperature during the reduction treatment is not particularly limited, and it may be 200° C. or higher, preferably 300° C. or higher, and may be less than 700° C., preferably 400° C. or lower and less than 700° C. When the reduction treatment is carried out within the above reduction treatment temperature range, the growth of the transition metal occurs sufficiently and within a preferable temperature range.

A pressure during the reduction treatment is not particularly limited, but it may be 0.01 to 10 MPa. When the pressure during the reduction treatment is set to the same condition as the ammonia synthesis condition described later, since complicated operations are unnecessary, the pressure range is preferable in view of production efficiency.

A time of the reduction treatment is not particularly limited, but in the case where the reduction treatment is carried out under normal pressure, it may be 1 hour or more, and preferably 2 hours or more.

When the reaction is carried out at a high reaction pressure, for example, 1 MPa or more, it is preferable that the reaction is carried out for 1 hour or more.

When a transition metal compound other than a transition metal compound converted to a transition metal by thermal decomposition is used, the transition metal compound contained in the solid mixture is reduced by a normal method, as in the aforementioned reduction treatment method, thereby providing the ammonia synthesis catalyst of the present embodiment.

The components other than the perovskite-type oxynitride and the transition metal may further include $SiO_2$, $Al_2O_3$, $ZrO_2$, MgO, activated carbon, graphite, SiC or the like as a support for the perovskite-type oxynitride.

The ammonia synthesis catalyst of the present embodiment can be used as a molded body using a conventional molding technique. As a shape of the catalyst, for example, a shape such as granular, spherical, tablet, ring, macaroni, four leaves, dice, honeycomb, and the like can be used. It can also be used after coating a suitable support.

When the catalyst for ammonia synthesis of the present embodiment is used, the reaction activity is not particularly limited, but when the rate of ammonia synthesis at a reaction temperature of 300° C. and a reaction pressure of 0.9 MPa is taken as an example, the reaction activity is preferably 1.0 mmol/g·h or more, more preferably 2.0 mmol/g·h or more because it is suitable for practical production conditions, still more preferably 3.0 mmol/g·h or more because it is suitable for high-efficiency production conditions, and the most preferably 5.0 mmol/g·h or more because it is more suitable for high-efficiency production conditions.

A method for producing ammonia using the ammonia synthesis catalyst of this embodiment will be described below.

(Method for Producing Ammonia)

The method for producing ammonia of the present invention is a method for synthesizing ammonia by reacting hydrogen with nitrogen using the supported metal catalyst or the catalyst for ammonia synthesis of the present invention as a catalyst on the catalyst. The method for producing ammonia of the present invention will be described by using an example of one embodiment of a method for producing ammonia using a perovskite-type oxynitride hydride (the present embodiment).

The method for producing ammonia of the present embodiment (Hereinafter, it may be referred to as the production method of the present embodiment.) is a method for synthesizing ammonia by reacting hydrogen with nitrogen using the supported metal catalyst of the present embodiment or the catalysts for ammonia synthesis of the present embodiment as a catalyst on the catalyst.

As a specific production method, a method for synthesizing ammonia by bringing hydrogen and nitrogen into contact with each other on the catalyst can be used, and it is not particularly limited, and the production can be appropriately carried out according to a known production method.

In the method for producing ammonia of the present embodiment, usually, when hydrogen and nitrogen are brought into contact with each other on the catalyst, the catalyst is heated to produce ammonia.

The reaction temperature in the production method of the present embodiment is not particularly limited, but is usually 200° C. or higher, preferably 250° C. or higher, more preferably 300° C. or higher, usually 600° C. or lower, preferably 500° C. or lower, and more preferably 450° C. or lower. Since ammonia synthesis is an exothermic reaction, although a lower temperature range is chemically advantageous for ammonia synthesis, it is preferable to carry out the reaction in the above temperature range in order to obtain a sufficient rate of ammonia synthesis.

In the production method of the present embodiment, the molar ratio of nitrogen and hydrogen brought into contact with the catalyst is not particularly limited, but usually the ratio of hydrogen to nitrogen ($H_2/N_2$ (volume/volume)) is 0.4 or more, preferably 0.5 or more, more preferably 1 or more, usually 10 or less, and preferably 5 or less.

The reaction pressure in the production method of the present embodiment is not particularly limited, but is usually 0.01 MPa or more, preferably 0.1 MPa or more, usually 20 MPa or less, preferably 15 MPa or less, and more preferably 10 MPa or less at the pressure of the mixed gas containing nitrogen and hydrogen. For practical use, the reaction is preferably carried out under a pressurized condition of atmospheric pressure or higher.

In the production method of the present embodiment, it is preferable to remove moisture or oxide adhering to the catalyst by using a dehydrating material, a cryogenic separation method, or hydrogen gas before bringing nitrogen and hydrogen into contact with the catalyst. The removal method includes reduction treatment.

In the production method of the present embodiment, in order to obtain a better ammonia yield, it is not particularly limited but the water content in nitrogen and the water content in hydrogen used in the production method of the present embodiment are preferably small, and the total water content in the mixed gas of nitrogen and hydrogen is usually preferably 100 ppm or less, preferably 50 ppm or less.

In the production method of the present embodiment, the type of the reaction vessel is not particularly limited, and a reaction vessel which can be normally used for the ammonia synthesis reaction can be used. As a specific reaction form, for example, a batch type reaction form, a closed circulation system reaction form, a flow system reaction form, and the like can be used. From a practical viewpoint, a flow reaction type is preferable. Any of the following methods can be used: a method for connecting a single reactor filled with a catalyst or a plurality of reactors; or a method for using a reactor having a plurality of reaction layers in the same reactor.

Since the reaction for synthesizing ammonia from hydrogen and nitrogen is an exothermic reaction with volume shrinkage, heat of reaction is preferably removed industrially in order to increase the ammonia yield, and a known reactor with a commonly used heat removal means may be used. For example, a method may be used in which a plurality of reactors filled with a catalyst are connected in series and an intercooler is installed at the outlet of each reactor to remove heat.

(Other Embodiments of Ammonia Synthesis Catalyst)

[Catalysts for Ammonia Synthesis Composed of $BaCeO_{3-x}N_yH_z$ Powder] The $BaCeO_{3-x}N_yH_z$ powder, which is obtained in the above embodiment and which does not support a transition metal, can be used as a catalyst for ammonia synthesis as it is (does not include a supported metal).

[Ammonia Synthesis Using $BaCeO_{3-x}N_yH_z$ Powder]
Ammonia Synthesis Reaction

The ammonia synthesis reaction was carried out under the same conditions as in the above embodiment. For example, as shown in Example 9 and FIG. 5 described later, the synthesis rate of ammonia at 400° C. and 0.9 MPa was 0.4 mmol/g/hr. The synthesis rate of ammonia at 500° C. and 0.9 MPa was 2.5 mmol/g/hr.

In the ammonia production method of the present embodiment, even if the ammonia synthesis catalyst obtained by the production method of the present embodiment is used alone, it can be used in combination with other known catalysts that can normally be used for ammonia synthesis.

EXAMPLE

Hereafter, the present invention will be described in more detail based on examples. An evaluation of the ammonia synthesis activity of the catalyst was carried out by determining the ammonia synthesis rate by quantifying the production of $NH_3$ by using a gas chromatograph or quantifying the solution in which $NH_3$ was dissolved in the sulfuric acid aqueous solution by using ion chromatography.

(Ion Chromatogram Analysis)

The ammonia gas discharged from the reaction vessel was dissolved in a 5 mM aqueous solution of sulfuric acid, and captured ammonium ion ($NH_4^+$) was analyzed by ion chromatography. Measurement conditions are shown below.

[Measurement Conditions]
  Apparatus: Shimadzu Corporation Prominence
  Detector: electric conductivity detector CDD-10Avp (Shimadzu Corporation)
  Column: Ion chromatogram column IC-C4 (manufactured by Shimadzu Corporation)
  Eluent: 3.0 mM oxalate+2.0 mM 18-crown-6-ether solution
  Flow Rate: 1.0 mL/min
  Column Temperature: 40° C.

Example 1

(Preparation of Catalyst for Ammonia Synthesis)
[Synthesis of $BaCeO_{3-x}N_yH_z$ Powder]

The $CeO_2$ was subjected to a vacuum heating treatment at 600° C. to remove water or the like adsorbed on the surface, and the dehydrated $CeO_2$ and $Ba(NH_2)_2$ were mixed in an Ar glove box using an agate mortar. At this time, the mixture was mixed so that the molar ratio of Ce and Ba was 1:1. The obtained powder was subjected to a heat treatment at 600° C. for 6 hours in a stream of $NH_3$ to obtain $BaCeO_{3-x}N_yH_z$ powder.

[Loading Ru on $BaCeO_{3-x}N_yH_z$]

0.50 g of the $BaCeO_{3-x}N_yH_z$ powder obtained by the above method and 0.056 g of $Ru_3(CO)_{12}$ (made by Aldrich, 99%) (equivalent to 5% by mass of the supported metal Ru for $BaCeO_{3-x}N_yH_z$) were inserted into a silica glass tube, heated at 70° C. for 1 hour in vacuum, followed by heating at 120° C. for 1 hour to load $Ru_3(CO)_{12}$ on the surface of the $BaCeO_{3-x}N_yH_z$ powder. Finally, by heating at 250° C. for 2 hours and pyrolyzing $Ru_3(CO)_{12}$, a metal supported material in which Ru is fixed on $BaCeO_{3-x}N_yH_z$, (hereinafter, Ru/$BaCeO_{3-x}N_yH_z$) was obtained.

In the following, ammonia synthesis was carried out using the ammonia synthesis catalyst.

[Ammonia Synthesis Using Ru-Supported $BaCeO_{3-x}N_yH_z$]
<Ammonia Synthesis Reaction>

The Ru/$BaCeO_{3-x}N_yH_z$ catalyst was brought into contact with a mixed gas of nitrogen and hydrogen to carry out an ammonia synthesis reaction. 0.1 g of Ru/$BaCeO_{3-x}N_yH_z$ was packed in an SUS reaction tube, and the reaction was carried out using a fixed bed flow reactor. The water content of nitrogen gas and that of hydrogen gas were below the detection limit, respectively. The flow rate of the raw material gas during the reaction was 15 mL/min for nitrogen gas and 45 mL/min for hydrogen gas (total 60 mL/min). In this reaction, the reaction pressure was 0.9 MPa, the reaction temperature was 300° C., and the reaction time was 30 hours.

<Ammonia Synthesis Rate>

Figure 7:
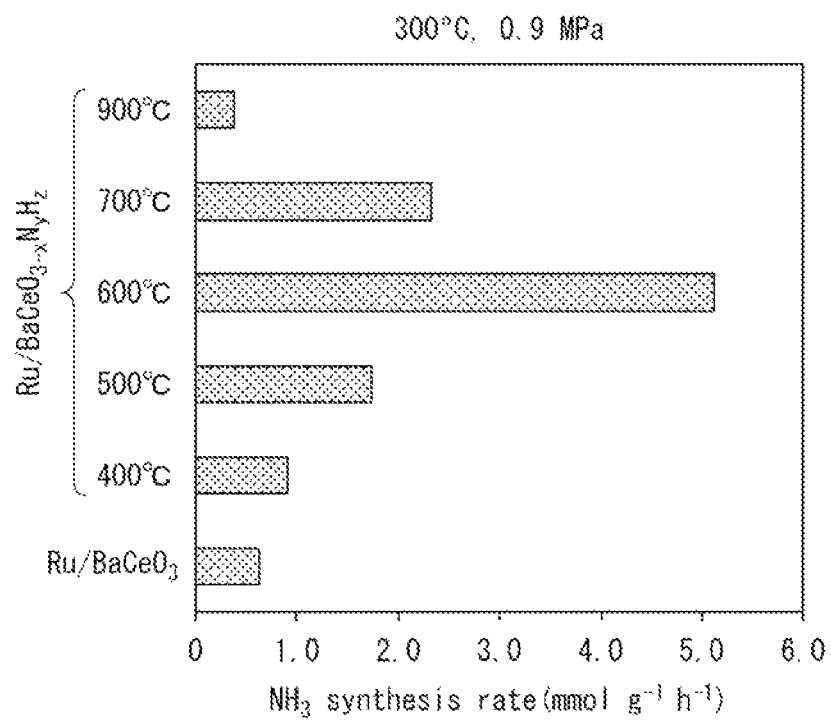
FIG. 7 is a graph showing the heat treatment temperature dependence of the ammonia synthesis rate when perovskite-type oxynitride hydrides synthesized at various heat treatment temperatures are used.

The gas coming out of the fixed bed flow reactor was bubbled into a 0.005 M sulfuric acid aqueous solution to dissolve ammonia in the gas, and the resulting ammonium ion was quantitatively determined by ion chromatography using the above method. The synthesis rate of ammonia formed by the ammonia synthesis reaction was measured with time by an ion chromatograph, and as a result, the catalytic activity of $BaCeO_{3-x}N_yH_z$ increased with increasing the synthesis temperature from 400° C. and it reached its maximum at 600° C. (FIG. 7). The ammonia synthesis rate was 5.1 mmol/g·hr. This value is much higher than that of Ru/$BaCeO_3$ (0.6 mmol/g·hr). The results are shown in Table 1.

Figure 8:
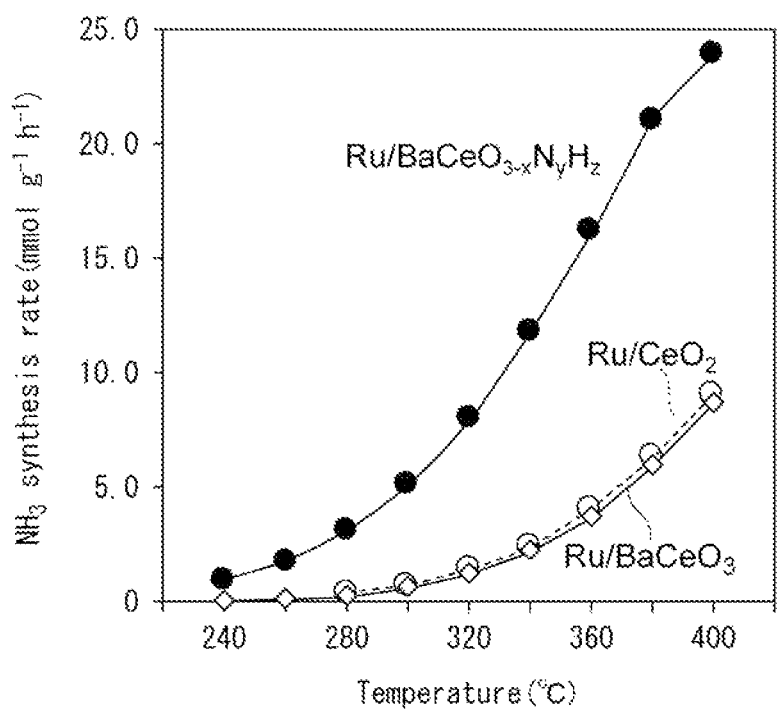
FIG. 8 is a graph showing the reaction temperature dependence of the ammonia synthesis rate in Example 1, Comparative Example 1, and Comparative Example 5.

The reaction temperature of the ammonia synthesis reaction was changed, and the reaction temperature dependence of the ammonia synthesis rate was evaluated. The results are shown in FIG. 8.

Example 2

[Loading Co on $BaCeO_{3-x}N_yI-L$]

95 mg of $BaCeO_{3-x}N_yH_z$ powder obtained by the above method and 14.5 mg of $Co_2(CO)_8$ (equivalent to 5% by mass of the supported metal Co for $BaCeO_{3-x}N_yH_z$) were placed in a quartz glass reaction tube, and nitrogen gas 15 mL/min and hydrogen gas 45 mL/min (total 60 mL/min) were passed through the reaction tube, and the temperature was raised to 400° C. for 2 hours and maintained for 5 hours to obtain a metal supported material in which Co was fixed on $BaCeO_{3-x}N_yH_z$ (hereinafter, Co/$BaCeO_{3-x}N_yH_z$).

In the following, ammonia synthesis was carried out using the ammonia synthesis catalyst.

[Ammonia Synthesis Using Co-supported $BaCeO_{3-x}N_yH_z$]
<Ammonia Synthesis Reaction>

Figure 5:
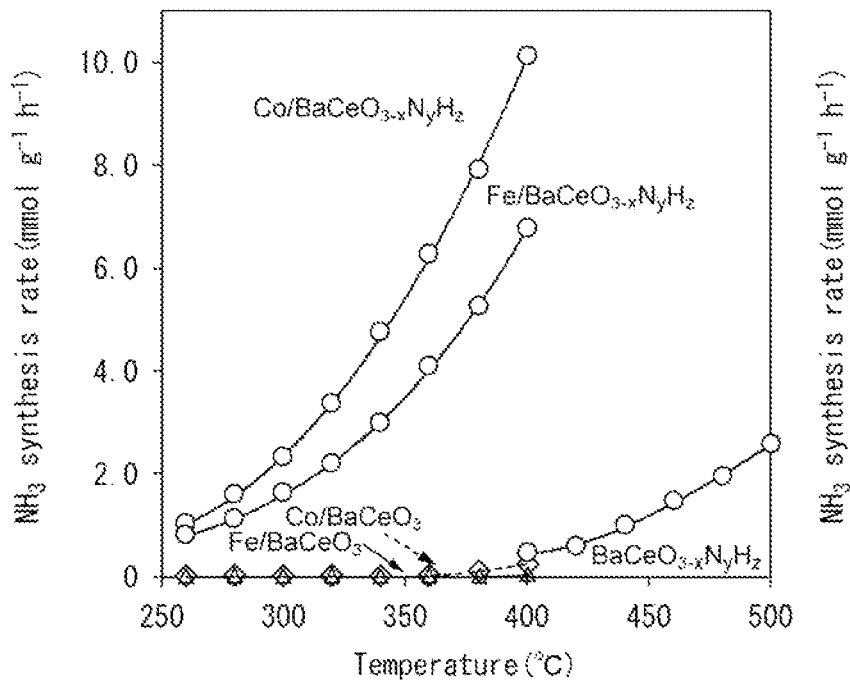
FIG. 5 is a graph showing the reaction temperature dependence of the ammonia synthesis rate in Examples 2 to 3, Comparative Examples 2 to 3 and Example 9.

A reaction for producing ammonia ($NH_3$) (Ammonia synthesis reaction) was carried out by using the same method and conditions as in Example 1 except that Co/BaCeO$_{3-x}$N$_y$H$_z$ was used as the catalyst instead of Ru/BaCeO$_{3-x}$N$_y$H$_z$ in Example 1.
<Ammonia Synthesis Rate>
By using the same method as in Example 1, the synthesis rate of ammonia formed by the ammonia synthesis reaction was measured with time by an ion chromatograph, and as a result, the ammonia synthesis rate was 2.32 mmol/g·hr. The results are shown in Table The reaction temperature dependence of the ammonia synthesis rate was evaluated by using the same method as in Example 1. The results are shown in FIG. 5.

Example 3

[Support of Fe on BaCeO$_{3-x}$N$_y$H$_z$]
95 mg of BaCeO$_{3-x}$N$_y$H$_z$ powder obtained by the above method and 16.3 mg of Fe$_2$(CO)$_9$ (equivalent to 5% by mass of the supported metal Fe for BaCeO$_{3-x}$N$_y$H$_z$) were placed in a quartz glass reaction tube, and then nitrogen gas 15 mL/min and hydrogen gas 45 mL/min (total 60 mL/min) were passed through the reaction tube, and the temperature was raised to 400° C. for 2 hours and maintained for 5 hours to obtain a metal supported material in which Fe was fixed on BaCeO$_{3-x}$N$_y$H$_7$ (hereinafter, Fe/BaCeO$_{3-x}$N$_y$H$_7$).

In the following, ammonia synthesis was carried out using the ammonia synthesis catalyst.
[Ammonia Synthesis Using Fe-Supported BaCeO$_{3-x}$N$_y$H$_z$]
<Ammonia Synthesis Reaction>
A reaction for producing ammonia (NH$_3$) (Ammonia synthesis reaction) was carried out by using the same method and conditions as in Example 1 except that Fe/BaCeO$_{3-x}$N$_y$H$_z$ was used as the catalyst instead of Ru/BaCeO$_{3-x}$N$_y$H$_z$ in Example 1.
<Ammonia Synthesis Rate>
By using the same method as in Example 1, the synthesis rate of ammonia formed by the ammonia synthesis reaction was measured with time by an ion chromatograph, and as a result, the ammonia synthesis rate was 1.62 mmol/g·hr. The results are shown in Table 1.

The reaction temperature dependence of the ammonia synthesis rate was evaluated by using the same method as in Example 1. The results are shown in FIG. 5.

Comparative Example 1

Synthesis of BaCeO$_3$ Powder
5.23 g (0.02 mol) of barium nitrate and 8.68 g (0.02 mol) of cerium nitrate hexahydrate and 38.4 g (0.2 mol) of citric acid were dissolved in water, to which 42.4 g (0.4 mol) of diethylene glycol was added to give a mixture. The resulting mixture was stirred for 1 hour and then heated at 120° C. for 4 hours to make gelling. The mixture was then carbonized by heating at 450° C. for 5 hours. BaCeO$_3$ powder was prepared by heating the carbonized mixed powder at 900° C. for 6 hours.
[Loading Ru on BaCeO$_3$]
By using the same method as in Example 1, a metal supported material Ru/BaCeO$_3$ was prepared by loading metal Ru in an amount of 5% by mass with respect to BaCeO$_3$.

In the following, ammonia synthesis was carried out using the ammonia synthesis catalyst.

[Ammonia Synthesis Using Ru-Supported BaCeO$_{3-x}$N$_y$H$_z$]
<Ammonia Synthesis Reaction>
The ammonia synthesis reaction was carried out by using the same method and conditions as in Example 1, except that the aforementioned Ru/BaCeO$_3$ was used as a catalyst instead of Ru/BaCeO$_{3-x}$N$_y$H$_z$, in Example 1.
<Ammonia Synthesis Rate>
By using the same method as in Example 1, the synthesis rate of ammonia formed by the ammonia synthesis reaction was measured with time by an ion chromatograph, and as a result, the synthesis rate of ammonia was 0.63 mmol/g·hr. The results are shown in Table 1.

The reaction temperature dependence of the ammonia synthesis rate was evaluated by using the same method as in Example 1. The results are shown in FIG. 8.

Comparative Example 2

[Synthesis of Co/BaCeO$_3$ Powder] By using the same method as in Comparative Example 1, a metal supported material Co/BaCeO$_3$ was prepared by loading a metal Co in an amount of 5% by mass with respect to BaCeO$_3$.
[Ammonia Synthesis Using Co/BaCeO$_3$]
<Ammonia Synthesis Reaction>
The ammonia synthesis reaction was carried out by using the same method and conditions as in Example 1 except that Co/BaCeO$_3$ was used as the catalyst.
<Ammonia Synthesis Rate>
By using the same method as in Example 1, the synthesis rate of ammonia formed by the ammonia synthesis reaction was measured with time by an ion chromatograph, and as a result, the synthesis rate of ammonia was 0 mmol/g·hr. The results are shown in Table 1.

The reaction temperature dependence of the ammonia synthesis rate was evaluated by using the same method as in Example 1. The results are shown in FIG. 5.

Comparative Example 3

[Synthesis of Fe/BaCeO$_3$ Powder]
In the same manner as in Comparative Example 1, Fe/BaCeO$_3$ was prepared by loading metal Fe in an amount of 5% by mass with respect to BaCeO$_3$.
[Ammonia Synthesis Using Fe/BaCeO$_3$]
<Ammonia Synthesis Reaction>
The ammonia synthesis reaction was carried out by using the same method and conditions as in Example 1 except that Fe/BaCeO$_3$ was used as the catalyst.
<Ammonia Synthesis Rate>
By using the same method as in Example 1, the synthesis rate of ammonia formed by the ammonia synthesis reaction was measured with time by an ion chromatograph, and as a result, the synthesis rate of ammonia was 0 mmol/g·hr. The results are shown in Table 1.

The reaction temperature dependence of the ammonia synthesis rate was evaluated by using the same method as in Example 1. The results are shown in FIG. 5.

Comparative Example 4

<Synthesis of Cs—Ru/MgO Powder>
5% by mass Ru—Cs/MgO catalyst (Cs/Ru element ratio=1) was prepared using the same method as in Example 1, except that MgO with Cs added (designated as Cs/MgO) was used instead of BaCeO$_{3-x}$N$_y$H$_z$ in Example 1.

[Ammonia Synthesis Using Cs—Ru/MgO]
<Ammonia Synthesis Reaction>
The ammonia synthesis reaction was carried out by using the same method and conditions as in Example 1. The synthesis rate of ammonia at 300° C. and 0.9 MPa was 0.55 mmol/g·hr as shown in Table 1. The results are shown in Table 1.

Comparative Example 5

<Synthesis of Ru/CeO$_2$ Powder>
5% by mass Ru/CeO$_2$ catalyst was prepared by the same method as in Example 1 except that CeO$_2$ was used instead of BaCeO$_{3-x}$N$_y$H$_z$ in Example 1.
[Ammonia Synthesis Using Ru/CeO$_2$]
<Ammonia Synthesis Reaction>
The ammonia synthesis reaction was carried out by using the same method and conditions as in Example 1. The synthesis rate of ammonia at 300° C. and 0.9 MPa was 0.72 mmol/g·hr as shown in Table 1.
The results are shown in Table 1.
The reaction temperature dependence of the ammonia synthesis rate was evaluated by using the same method as in Example 1. The results are shown in FIG. 8.

Comparative Example 6

[Synthesis of Ru/C12A7:e$^-$ Powder]
Instead of BaCeO$_{3-x}$N$_y$H$_1$, in Example 1, 2% by mass Ru/C12A7:e-catalyst was prepared in the same manner as described in WO 2012/0077658.
[Ammonia Synthesis Using Ru/C12A7:e$^-$]
<Ammonia Synthesis Reaction>
The ammonia synthesis reaction was carried out by using the same method and conditions as in Example 1. The synthesis rate of ammonia at 300° C. and 0.9 MPa was 0.76 mmol/g·hr as shown in Table 1.
The results are shown in Table 1.

Comparative Example 7

<Synthesis of Ru/Ca$_2$N Powder>
Instead of BaCeO$_{3-x}$N$_y$H$_z$ in Example 1, 5 wt % Ru/Ca$_2$N catalyst was prepared in the same manner as described in WO 2015/129471.
[Synthesis of Ammonia Using Ru/Ca$_2$N]
<Ammonia Synthesis Reaction>
The ammonia synthesis reaction was carried out by using the same method and conditions as in Example 1. The synthesis rate of ammonia at 300° C. and 0.9 MPa was 1.74 mmol/g·hr as shown in Table 1.
The results are shown in Table 1.

Comparative Example 8

[Synthesis of Ba—Ru/HT-C12A7 Powder]
5% by mass Ba—Ru/HT-C12A7 catalyst was prepared by the same method as in Example 1 except that Ca$_2$N was used instead of BaCeO$_{3-x}$N$_y$H$_z$, in Example 1.
[Ammonia Synthesis Using Ba—Ru/HT-C12A7]
<Ammonia Synthesis Reaction>
The ammonia synthesis reaction was carried out under the same conditions as in Example 1. The synthesis rate of ammonia at 300° C. and 0.9 MPa was 2.33 mmol/g·hr as shown in Table 1. The results are shown in Table 1.

Examples 4 to 8

Figure 2:
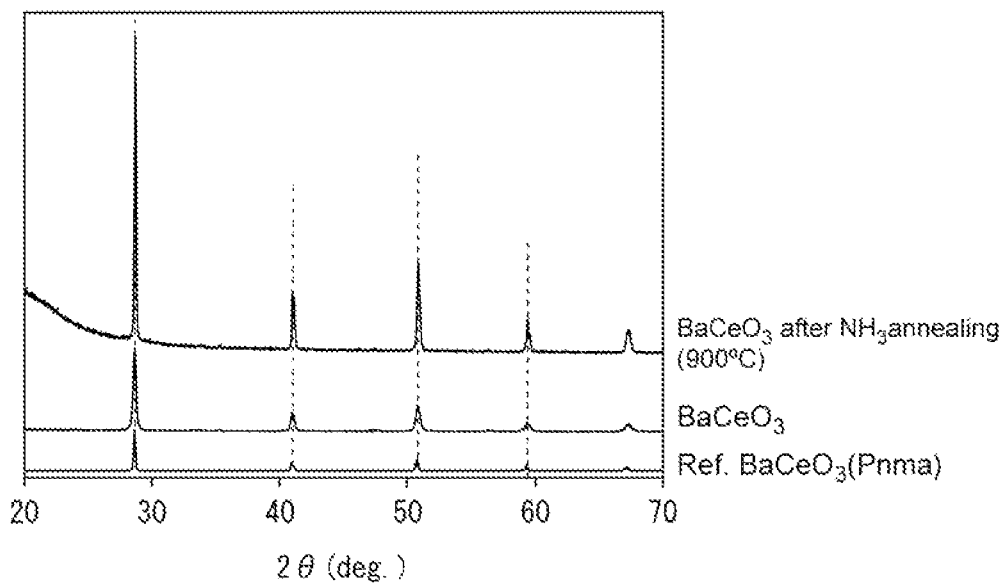
FIG. 2 is an XRD pattern of a $BaCeO_3$ powder synthesized in the prior art and a sample obtained by heating the $BaCeO_3$ powder at 900° C. under an ammonia stream.
Figure 3:
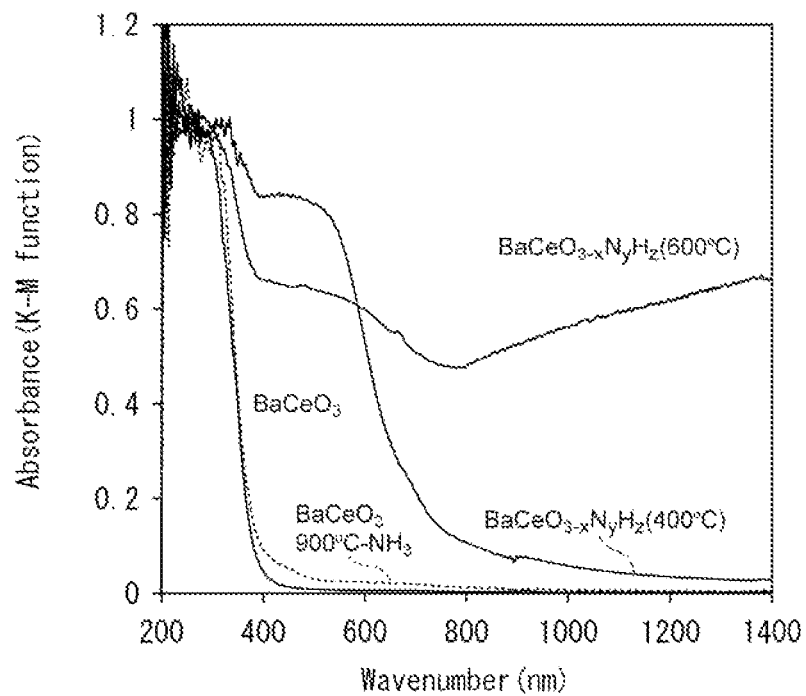
FIG. 3 is a UV-vis absorption spectrum of the perovskite-type oxynitride hydride obtained in Example 1 and Example 7, $BaCeO_3$ powder synthesized in the prior art, and a sample obtained by heating the $BaCeO_3$ powder at 900° C. in an ammonia stream.
Figure 4:
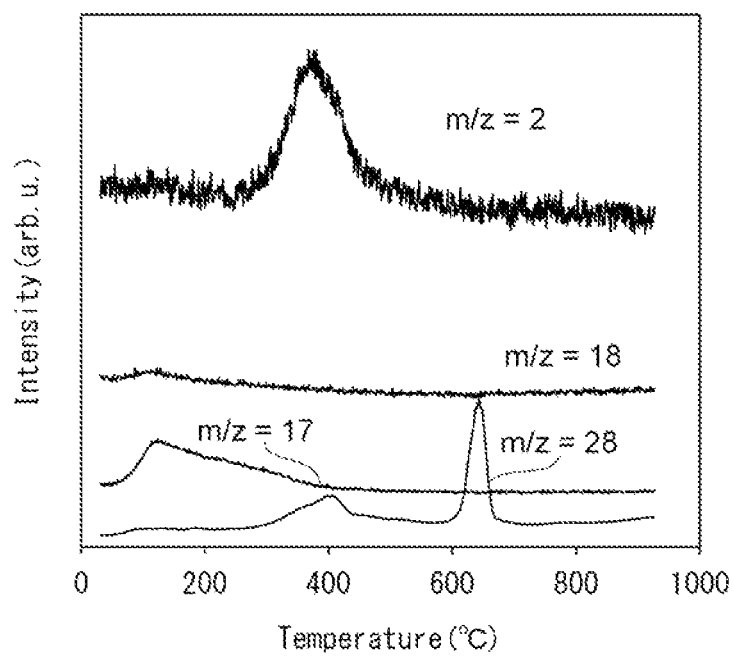
FIG. 4 is a temperature-programmed desorption spectrum of $BaCeO_{3-x}N_yH_z$ obtained in Example 1.

Evaluation of BaCeO$_{3-x}$N$_y$H$_z$ Powder Synthesized at Different Heat Treatment Temperatures
Each BaCeO$_{3-x}$N$_y$H$_z$ powder was prepared by the same method as in Example 1 except that each heat treatment temperature in the NH$_3$ stream shown in Table 2 was used, instead of the heat treatment temperature of 600° C. in Example 1.
<XRD of BaCeO$_{3-x}$N$_y$H$_z$ Powder>
XRD patterns of samples synthesized using the methods described above at various heat treatment temperatures are shown in FIG. 1. The sample synthesized at 300° C. showed the same diffraction pattern as BaCeO$_3$ with perovskite structure. On the other hand, a peak originating from CeO$_2$ was also observed as an impurity. This indicates that some of the starting material CeO$_2$ remains unreacted. On the other hand, when the heat treatment temperature was increased, the peak of CeO$_2$ decreased, and a material having almost a single phase was obtained at 600° C. In all the samples synthesized by this method, the peak shifted to the low angle side in comparison with BaCeO$_3$. This may be due to the presence of nitrogen with a large ionic radius (ionic radius: 1.46 Å) at the oxygen (ionic radius: 1.38 Å) site in BaCeO$_3$. On the other hand, at temperatures higher than 700° C., the crystal structure changed and a peak having the same crystal structure as that of BaCe$_2$O$_4$ appeared. Above 700° C., it is considered that BaCe$_2$O$_{4-x}$N$_y$H$_z$ was formed.
On the other hand, when BaCeO$_3$ was heated at 900° C. for 6 hours under NH$_3$ air flow, no peak shift was observed (FIG. 2).
<UV-vis Absorption Spectra of Perovskite-Type Oxynitride Hydride>
As shown in FIG. 3, BaCeO$_3$ was a white powder with an absorption edge of about 400 nm, while BaCeO$_{3-x}$N$_y$H$_z$ powder synthesized by the present method had a red-brown color and an absorption edge of about 800 nm at 400° C. Furthermore, those synthesized at 600° C. exhibited black color and showed absorption from visible light to near infrared region. On the other hand, the powder of BaCeO$_3$ heated at 900° C. under NH$_3$ air flow for 6 hours showed light gray color, and showed absorption up to 400 nm and small absorption in the visible light region. The large absorption in the visible light region of the BaCeO$_{3-x}$N$_y$H$_z$ powder is considered to be due to the high concentration of nitrogen introduced into the oxygen site.
<Determination of Content of Nitrogen and Hydrogen in BaCeO$_{3-x}$N$_y$H$_z$>
FIG. 4 shows the results of analysis of BaCeO$_{3-x}$N$_y$H$_z$ synthesized at 600° C. using a temperature-programmed desorption analyzer (BELCATA). Desorption of hydrogen was observed from around 250° C., showed a maximum value at around 380° C., and desorption of hydrogen was observed up to around 530° C. On the other hand, nitrogen showed desorption peaks with maximum values around 420° C. and 650° C. On the basis of the results of the amounts of desorbed nitrogen and hydrogen and the results of the analysis of the obtained BaCeO$_{3-x}$N$_y$H$_z$ by X-ray photoelectric spectroscopy (i.e., XPS method), BaCeO$_{1.8}$N$_{0.51}$H$_{0.41}$ can be expressed by adding the oxidation number of Ce determined from the percentage of tetravalent Ce and trivalent Ce (Specifically, Ce$^{3+}$/(Ce$^{3+}$+Ce$^{4+}$)=0.46). On the basis of the results of the amounts of nitrogen and hydrogen desorbed, if the oxidation number of all Ce is 4, BaCeO$_{2.03}$N$_{0.51}$H$_{0.41}$ can be expressed. The specific surface area of BaCeO$_{3-x}$N$_y$H$_z$ was about 5 m$^2$/g.

Example 9

[Catalysts for Ammonia Synthesis Composed of BaCeO$_{3-x}$N$_y$H$_z$ Powder]

The BaCeO$_{3-x}$N$_y$H$_z$ powder obtained in Example 1 was used as a catalyst for ammonia synthesis without loading a transition metal (not including a supporting metal).

[Ammonia Synthesis Using BaCeO$_{3-x}$N$_y$H$_z$ Powder]
<Ammonia Synthesis Reaction>

Figure 6:
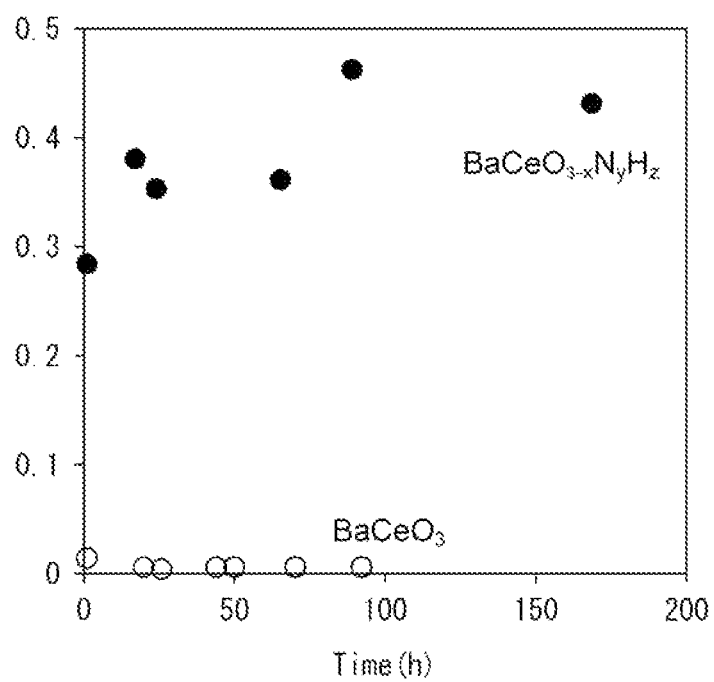
FIG. 6 is a graph showing a change of ammonia synthesis rates with time in Example 9 and Comparative Example 9.

The ammonia synthesis reaction was carried out by using the same method and conditions as in Example 1. The synthesis rate of ammonia at 400° C. and 0.9 MPa was 0.4 mmol/g/hr. The result of evaluating the change over time is shown in FIG. 6. The synthesis rate of ammonia at 500° C. and 0.9 MPa was 2.5 mmol/g/hr.

The reaction temperature dependence of the ammonia synthesis rate was evaluated by using the same method as in Example 1. The results are shown in FIG. 5.

Comparative Example 9

[Catalysts for Ammonia Synthesis Composed of BaCeO$_3$ Powder]

The BaCeO$_3$ powder obtained in Comparative Example 1 was used as a catalyst for ammonia synthesis without loading a transition metal (not including a supporting metal).
[Ammonia Synthesis Using BaCeO$_3$ Powder]
<Ammonia Synthesis Reaction>

By using the same method as in Example 1, the synthesis rate of ammonia formed by the ammonia synthesis reaction was measured with time by an ion chromatograph, and as a result, the synthesis rate of ammonia was 0 mmol/g·hr. The result of evaluating the change with time is shown in FIG. 6.

Example 10

(Preparation of Catalyst for Ammonia Synthesis)
[Synthesis of BaLa$_2$O$_{4-x}$N$_y$H$_z$ Powder]

La$_2$O$_3$ was subjected to a vacuum heating treatment at 600° C. to remove water or the like adsorbed on the surface, and then the dehydrated La$_2$O$_3$ and Ba(NH$_2$)$_2$ were mixed in an Ar glove box using an agate mortar. At this time, La and Ba were mixed in a molar ratio of 2:1. The obtained powder was subjected to a heat treatment at 600° C. for 6 hours in a stream of NH$_3$ to obtain BaLa$_2$O$_{4-x}$N$_y$H$_z$ powder.

[Loading Ru on BaLa$_2$O$_{4-x}$N$_y$H$_z$]

0.50 g of the BaLa$_2$O$_{4-x}$N$_y$H$_z$ powder obtained by the above method and 0.056 g of Ru$_3$(CO)$_{12}$ (made by Aldrich, 99%) (equivalent to 5% by mass of the supported metal Ru for BaLa$_2$O$_{4-x}$N$_y$H$_z$) were inserted into a silica glass tube, which was heated at 70° C. for 1 hour in vacuum, followed by heating at 120° C. for 1 hour to load Ru$_3$(CO)$_{12}$ on the surface of the BaLa$_2$O$_{4-x}$N$_y$H$_z$ powder Finally, by heating at 250° C. for 2 hours and pyrolyzing Ru$_3$(CO)$_{12}$, a metal supported material in which Ru is fixed on BaLa$_2$O$_{4-x}$N$_y$H$_z$ (hereinafter, Ru/BaLa$_2$O$_{4-x}$N$_y$H$_z$) was obtained.

In the following, ammonia synthesis was carried out using the ammonia synthesis catalyst.

[Ammonia Synthesis Using Ru-Supported BaLa$_2$O$_{4-x}$N$_y$H$_z$]
<Ammonia Synthesis Reaction>

The Ru/BaLa$_2$O$_{4-x}$N$_y$H$_z$ catalyst was brought into contact with a mixed gas of nitrogen and hydrogen to carry out an ammonia synthesis reaction. The above Ru/BaLa$_2$O$_{4-x}$N$_y$H$_z$ 0.1 g was packed in an SUS reaction tube, and the reaction was carried out using a fixed bed flow reactor. The water content of nitrogen gas and that of hydrogen gas were below the detection limit, respectively. The flow rate of the raw material gas during the reaction was 15 mL/min for nitrogen gas and 45 mL/min for hydrogen gas (total 60 mL/min). In this reaction, the reaction pressure was 0.9 MPa, the reaction temperature was 300° C., and the reaction time was 30 hours.

<Ammonia Synthesis Rate>

The gas coming out of the fixed bed flow type reactor was bubbled into a 0.005 M sulfuric acid aqueous solution, ammonia in the gas was dissolved, and the produced ammonium ion was determined by the above method by an ion chromatograph. As a result of measuring the synthesis rate of ammonia formed by the ammonia synthesis reaction with time by ion chromatography, the ammonia synthesis rate was 2.60 mmol/g·hr.

Example 11

A catalyst for the synthesis of ammonia on other oxynitride hydrides, such as ABO$_{3-x}$N$_y$H$_z$, is prepared according to a method similar to that described in Examples 1, 2 and 3. Also, a catalyst for the synthesis of ammonia on other oxynitride hydrides such as AB$_2$O$_{4-x}$N$_y$H$_z$ is prepared in the same manner as described in Example 10.

First, a powder of another oxynitride hydride such as ABO$_{3-x}$N$_y$H$_z$ or a powder of another oxynitride hydride such as AB$_2$O$_{4-x}$N$_y$H$_z$ is prepared. A support having a transition metal fixed on the surface of another prepared oxynitride hydride powder is then obtained.

Ammonia synthesis is carried out by using the obtained support as a catalyst for ammonia synthesis in accordance with a method similar to that described in Example 1, Example 2, Example 3 and Example 10.

TABLE 1

| | Catalyst | Catalytic Activity (NH$_3$ Synthesis Rate) (mmol · g$^{-1}$ h$^{-1}$) |
|---|---|---|
| Example 1 | 5% by mass Ru/BaCeO$_{3-x}$N$_y$H$_z$ | 5.12 |
| Example 2 | 5% by mass Co/BaCeO$_{3-x}$N$_y$H$_z$ | 2.32 |
| Example 3 | 5% by mass Fe/BaCeO$_{3-x}$N$_y$H$_z$ | 1.62 |
| Example 10 | 5% by mass Ru/BaLa$_2$O$_{4-x}$N$_y$H$_z$ | 2.60 |
| Comparative Example 1 | 5% by mass Ru/BaCeO$_3$ | 0.63 |
| Comparative Example 2 | 5% by mass Co/BaCeO$_3$ | 0 |
| Comparative Example 3 | 5% by mass Fe/BaCeO$_3$ | 0 |
| Comparative Example 4 | 5% by mass Ru—Cs/MgO | 0.55 |
| Comparative Example 5 | 5% by mass Ru—Cs/CeO$_2$ | 0.72 |
| Comparative Example 6 | 2% by mass Ru/C12A7:e$^-$ | 0.76 |
| Comparative Example 7 | 5% by mass Ru/Ca$_2$N | 1.74 |
| Comparative Example 8 | 5% by mass Ba—Ru/HT-C12A7 | 2.33 |

The reaction conditions of the Examples and Comparative Examples in Table 1 are as follows.

Amount of catalyst: 0.1 g; Reaction temperature: 300° C.; Reaction gas flow rate: 60 mL/min Reaction gas composition: N$_2$/H$_2$=1/3 (v/v); Reaction pressure: 0.9 MPa

TABLE 2

| | BaCeO$_{3-x}$N$_y$H$_z$ Powder | Heat Treatment Temperature (° C.) |
|---|---|---|
| Example 1 | Ru/BaCeO$_{3-x}$N$_y$H$_z$ | 600 |
| Example 4 | Ru/BaCeO$_{3-x}$N$_y$H$_z$ | 900 |
| Example 5 | Ru/BaCeO$_{3-x}$N$_y$H$_z$ | 700 |
| Example 6 | Ru/BaCeO$_{3-x}$N$_y$H$_z$ | 500 |
| Example 7 | Ru/BaCeO$_{3-x}$N$_y$H$_z$ | 400 |
| Example 8 | Ru/BaCeO$_{3-x}$N$_y$H$_z$ | 300 |

The effect of the catalyst for ammonia synthesis of the present invention is that, unlike a general method in which an oxide such as a perovskite-type oxide is synthesized and then its oxygen site is replaced with nitrogen or hydrogen, since a metal amide material containing an A-site element of a crystal structure of an oxide such as an ABO$_3$-type perovskite and a transition metal oxide containing a B-site element are used as raw materials, an oxynitride hydride such as a perovskite-type oxynitride hydride can be synthesized at low temperature and in one step.

The material synthesized by this method exhibits remarkably high ammonia synthesis activity compared with the oxide having the same crystal structure. Further, in a catalyst in which transition metal nanoparticles such as Ru are fixed on a perovskite-type oxide as one embodiment of the present invention, the reaction proceeds by the Langmuir-Hinshelwood reaction mechanism in which the dissociation of nitrogen molecules and hydrogen molecules occurs on the transition metal nanoparticles to form ammonia, as in a conventional ammonia synthesis catalyst. However, in the catalyst of the present, ammonia synthesis proceeds by the Mars-van Krevelen mechanism in which nitrogen and hydrogen doped in the backbone of the support material are directly involved in the reaction, and the catalyst exhibits high catalytic activity even in a low temperature region. As a result, the activation energy of the catalyst for ammonia synthesis of the present invention is about half that of a conventional catalyst.

The invention claimed is:

1. An oxynitride hydride represented by the following general formula (1a) or (1b), $$ABO_{3-x}N_yH_z \quad (1a)$$

$$AB_2O_{4-x}N_yH_z \quad (1b)$$

wherein, in the general formula (1a), A is at least one kind selected from the group consisting of Ba and Sr; B is Ce; x represents a number represented by 0.2≤x≤2.0; y represents a number represented by 0.1≤y≤1.0; and z represents a number represented by 0.1≤z≤1.0, and in the above general formula (1b), A is at least one kind selected from the group consisting of Ba and Sr; B is at least one kind selected from the group consisting of Ce, La and Y; x represents a number represented by 0.2≤x≤2.0; y represents a number represented by 0.1≤y≤ 1.0; and z represents a number represented by 0.1≤z≤1.0.

2. A perovskite-type oxynitride hydride represented by the following general formula (2), $$BaCeO_{3-x}N_yH_z \quad (2)$$

wherein, in the general formula (2), x represents a number represented by 0.2≤x≤2.0; y represents a number represented by 0.1≤y≤1.0; and z represents a number represented by 0.1≤ z≤1.0.

3. The perovskite-type oxynitride hydride according to claim 1,
wherein, in the general formula (Ia), y represents a number represented by 0.4≤y≤0.6; and
in the general formula (Ib), y represents a number represented by 0.4≤y≤0.6.

4. The perovskite-type oxynitride hydride according to claim 2,
wherein, in the general formula (2), y represents a number represented by 0.4≤y≤0.6.

5. A supported metal material in which a transition metal (M) is supported on a support,
wherein the supported metal material is a composition comprising the oxynitride hydride according to claim 1.

6. The supported metal material according to claim 5, wherein a loading amount of the transition metal (M) is 0.01 parts by mass or more and 50 parts by mass or less with respect to 100 parts by mass of the support.

7. The supported metal material according to claim 5, wherein the transition metal (M) is at least one selected from the group consisting of Ru, Co and Fe.

8. A supported metal catalyst comprising the supported metal material according to claim 3.

9. A catalyst for ammonia synthesis comprising the supported metal material according to claim 3.

10. A catalyst for ammonia synthesis, which is a composition containing the oxynitride hydride according to claim 1.

11. A supported metal material in which a transition metal (M) is supported on a support,
wherein the supported metal material is a composition comprising the oxynitride hydride according to claim 2.

12. The supported metal material according to claim 11, wherein a loading amount of the transition metal (M) is 0.01 parts by mass or more and 50 parts by mass or less with respect to 100 parts by mass of the support.

13. The supported metal material according to claim 11, wherein the transition metal (M) is at least one selected from the group consisting of Ru, Co and Fe.

14. A supported metal catalyst comprising the supported metal material according to claim 11.

15. A catalyst for ammonia synthesis comprising the supported metal material according to claim 11.

16. A catalyst for ammonia synthesis, which is a composition containing the oxynitride hydride according to claim 2.

17. A method for producing an oxynitride hydride represented by the following general formula (1a) or (1b), the method comprises a step of heating a compound represented by the following general formula (3) and a compound represented by the following general formula (4a) or (4b) in an ammonia atmosphere, $$ABO_{3-x}N_yH_z \quad (1a)$$

$$AB_2O_{4-x}N_yH_z \quad (1b)$$

$$A(NH_2)_2 \quad (3)$$

$$BO_2 \quad (4a)$$

$$B_2O_3 \quad (4b)$$

wherein, in the formulas (1a), (3) and (4a), A is at least one kind selected from the group consisting of Ba and Sr; B is Ce; x represents a number represented by 0.2≤x≤2.0; y represents a number represented by 0.1≤y≤1.0; and z represents a number represented by 0.1≤z≤1.0, and in the above general formulas (1b) and (4b), A is at least one kind selected from the group consisting of Ba and Sr; B is Ce, La and Y; x represents a number represented by $0.2 \leq x \leq 2.0$; y represents a number represented by $0.1 \leq y \leq 1.0$; and z represents a number represented by $0.1 \leq z \leq 1.0$.

18. A method for producing a perovskite-type oxynitride hydride represented by the following general formula (2), the method comprises a step of heating $CeO_2$ and $Ba(NH_2)_2$ in an ammonia atmosphere, $$BaCeO_{3-x}N_yH_z \tag{2}$$

wherein, in the general formula (2), x represents a number represented by $0.2 \leq x \leq 2.0$; y represents a number represented by $0.1 \leq y \leq 1.0$; and z represents a number represented by $0.1 \leq z \leq 1.0$.

19. The method according to claim 17,
wherein, in the general formula (Ia), y represents a number represented by $0.4 \leq y \leq 0.6$; and
in the general formula (Ib), y represents a number represented by $0.4 \leq y \leq 0.6$.

* * * * *